(12) United States Patent
Jaegle et al.

(10) Patent No.: US 9,702,325 B2
(45) Date of Patent: Jul. 11, 2017

(54) GAS INJECTOR HAVING A DUAL VALVE NEEDLE

(71) Applicant: Robert Bosch GmbH, Stuttgart (DE)

(72) Inventors: Felix Jaegle, Ditzingen (DE); Olaf Ohlhafer, Erligheim (DE); Joerg Schoefer, Gerlingen (DE); Robert Giezendanner-Thoben, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 14/658,493

(22) Filed: Mar. 16, 2015

(65) Prior Publication Data

US 2015/0267659 A1     Sep. 24, 2015

(30) Foreign Application Priority Data

Mar. 24, 2015  (DE) ......................... 10 2014 205 454

(51) Int. Cl.
| | |
|---|---|
| *F02M 45/08* | (2006.01) |
| *F02M 61/18* | (2006.01) |
| *F02M 63/00* | (2006.01) |
| *F02M 21/02* | (2006.01) |
| *F02M 51/06* | (2006.01) |

(52) U.S. Cl.
CPC ...... *F02M 45/086* (2013.01); *F02M 21/0254* (2013.01); *F02M 21/0269* (2013.01); *F02M 21/0275* (2013.01); *F02M 51/061* (2013.01); *F02M 61/1886* (2013.01); *F02M 63/0007* (2013.01); *F02M 51/0603* (2013.01); *Y02T 10/32* (2013.01)

(58) Field of Classification Search
CPC ............ F02M 45/086; F02M 21/0269; F02M 21/0275; F02M 21/0254; F02M 63/0007; F02M 61/1886; F02M 51/061; F02M 51/0603; Y02T 10/32
See application file for complete search history.

(56) References Cited

U.S. PATENT DOCUMENTS

| | | | | | |
|---|---|---|---|---|---|
| 4,545,345 | A | * | 10/1985 | Pagdin | ................ F02D 41/0027 123/299 |
| 6,073,592 | A | * | 6/2000 | Brown | .................. F02D 19/105 123/27 GE |
| 6,513,733 | B1 | * | 2/2003 | Lambert | .............. F02M 45/086 239/5 |
| 8,104,258 | B1 | * | 1/2012 | Jansen | .................... F02C 7/232 137/240 |
| 2002/0070295 | A1 | * | 6/2002 | Baker | .................... F02M 43/02 239/533.3 |
| 2004/0123833 | A1 | * | 7/2004 | Hotta | .................... F02B 17/005 123/276 |

* cited by examiner

*Primary Examiner* — Joseph Dallo
(74) *Attorney, Agent, or Firm* — Norton Rose Fulbright US LLP; Gerard Messina

(57) ABSTRACT

A gas injector for injecting gaseous fuel includes: a valve body; an outer needle which is a hollow needle; an inner needle disposed in a hollow region of the outer needle; and an actuator system configured to actuate the outer needle and the inner needle independently of each other in each case. A first sealing seat is provided between the valve body and the outer needle, and a second sealing seat is provided between the outer needle and the inner needle.

10 Claims, 3 Drawing Sheets

GAS INJECTOR HAVING A DUAL VALVE NEEDLE

BACKGROUND OF THE INVENTION

1. Field of the Invention

The present invention relates to a gas injector for injecting gaseous fuel with the aid of a dual valve needle.

2. Description of the Related Art

Apart from liquid fuels, gaseous fuels, such as natural gas or hydrogen, have lately also been used for operating vehicles to an increasing extent. However, the known injectors are only conditionally suitable for these gaseous fuels, since gaseous fuels have different energy densities and volumes than liquid fuels. To ensure that internal combustion engines operated on the basis of such fuels have no excessive consumption and expel only a minimum of pollutants, it is necessary to inject the most exact gas quantities possible during each injection process. One or more injection process(es) per combustion cycle must also be possible in this context. Apart from the necessity of injecting a certain maximum quantity within a predefined period of time, there must also be the possibility of metering defined minimal gas quantities in a precise manner. A low system pressure should prevail during the process, so that a content of a gas tank can be utilized to the fullest extent possible. Furthermore, between the injection processes, the injector has to seal the gas from the combustion chamber. FIG. 1 schematically illustrates an example of the nozzle-side end of a known gas injector 1, in which an outwardly opening valve needle 3 sits on a valve seat 2 in a housing 5. FIG. 1 shows the closed state of the injector. When this injector is opened, an effective overall opening cross-section initially becomes linearly larger across the lift, as long as a released annular cross-sectional area at the valve needle constitutes the smallest cross-section. As soon as the annular gap between valve needle 3 having radius R1 and housing 5 has a smaller cross-sectional area than the cross-sectional area between valve seat 2 and housing 5 released by the lift, a blow-in injection rate is constant.

When configuring gas injectors, there is a conflict in objectives between the necessary mass flow rate during an injection and the need for the lowest possible system pressure of the gas. As a result, gas injectors must have the greatest possible flow cross-sections. However, because space is usually limited, the large flow cross-sections are frequently unable to be realized by simple upscaling of the dimensions of the injectors, especially in the case of outwardly opening injectors.

BRIEF SUMMARY OF THE INVENTION

In contrast, the gas injector according to the present invention for the injection of gaseous fuel for an internal combustion engine has the advantage that a flow cross-section in an open injector is able to be increased, so that even at low system pressures a sufficiently large gas quantity is injectable within a predefined time. The gas injector according to the present invention has a very compact and small design, so that it can be used even in tight engine compartments. The gas injector according to the present invention includes a valve body and a dual valve needle having an outer needle and an inner needle. In addition, an actuator system is provided, which is designed to actuate the outer needle and the inner needle independently of each other in each case. In the present invention, it is therefore possible to actuate only the outer needle or only the inner needle or both needles at different times. The largest opening cross-section preferably results when both needles are actuated. The outer needle is a hollow needle, and the inner needle is situated in the hollow region of the hollow outer needle. Furthermore, a first sealing seat is developed between the valve body and the outer needle, and a second sealing seat is developed between the outer needle and the inner needle. Placing the inner needle within the outer needle makes for a very compact design. If both needles are in the open state, a large opening cross-section can be achieved, and the required gas quantity or gas mass is able to be injected within a predefined period of time even at the lowest possible system pressure.

The actuator system preferably includes a first actuator for actuating the inner needle and a second actuator for actuating the outer needle. This makes it possible to realize an individual actuation of the outer needle and the inner needle in a relatively simple manner. Although two actuators are admittedly required for this purpose, a broader usage spectrum results in this way, in which different injection strategies are able to be realized, as well. For example, the inner needle can be opened earlier than the outer needle, or the outer needle earlier than the inner needle, or both needles are opened simultaneously. The same also applies to the respective closing processes. As a result, different injection strategies with regard to the opening and closing of the gas injector are possible, depending on the intended use and the individual operating state of an internal combustion engine, for instance.

According to an alternative development of the present invention, the actuator system includes precisely one actuator, a first compression element and a second compression element. The first compression element is preferably situated between the inner needle and the outer needle, and the second compression element is preferably situated between the outer needle and the valve body. This configuration thus makes it possible to also realize a stepped opening of the inner needle and outer needle using precisely one actuator, preferably by selecting different prestress forces of the compression elements. The opening characteristic is therefore obtainable as a function of a lift effected by an actuator.

The prestress forces of the two compression elements especially preferably differ. Furthermore, the prestress forces of the two compression elements are preferably adjustable, so that different operating states of an internal combustion engine having different injection strategies are available, as well. The compression elements especially preferably are springs.

Moreover, the gas injector preferably includes a stop, which delimits a movement of the inner needle and/or the outer needle, so that a maximum lift can be specified in an uncomplicated manner. In particular when using two actuators for the individual actuation of the inner needle and the outer needle, the use of a stop makes it easy to restrict a maximum lift.

In addition, the gas injector preferably also includes a slaving element; after one of the two needles has traveled a predefined lift length, the other needle is carried along by this slaving element. Especially preferably, the slaving element is situated on the inner needle, which, once a predefined lift has been realized, then carries the outer needle along and lifts the outer needle off from the first sealing seat at the valve body.

Moreover, the actuator system preferably includes a magnet armature or a piezo actuator.

Especially preferably, the outer needle and the inner needle are outwardly opening closing elements. As a result, an outwardly opening gas injector having a compact design is able to be provided in an uncomplicated manner.

In addition, the gas injector is preferably used in internal combustion engines having direct injection. The gas injector is situated directly at a combustion chamber of an internal combustion engine and injects directly into the combustion chamber.

The present invention furthermore relates to a gas-operated internal combustion engine, which includes a gas injector according to the present invention. The internal combustion engine especially preferably is used in a vehicle.

Preferred exemplary embodiments of the present invention are described in detail below, with reference to the accompanying drawing. Identical or functionally equivalent parts are designated by the same reference numerals.

DETAILED DESCRIPTION OF THE INVENTION

In the following text, a gas injector 1 according to a first preferred exemplary embodiment of the present invention is described in detail with reference to FIG. 2.

Figure 1:
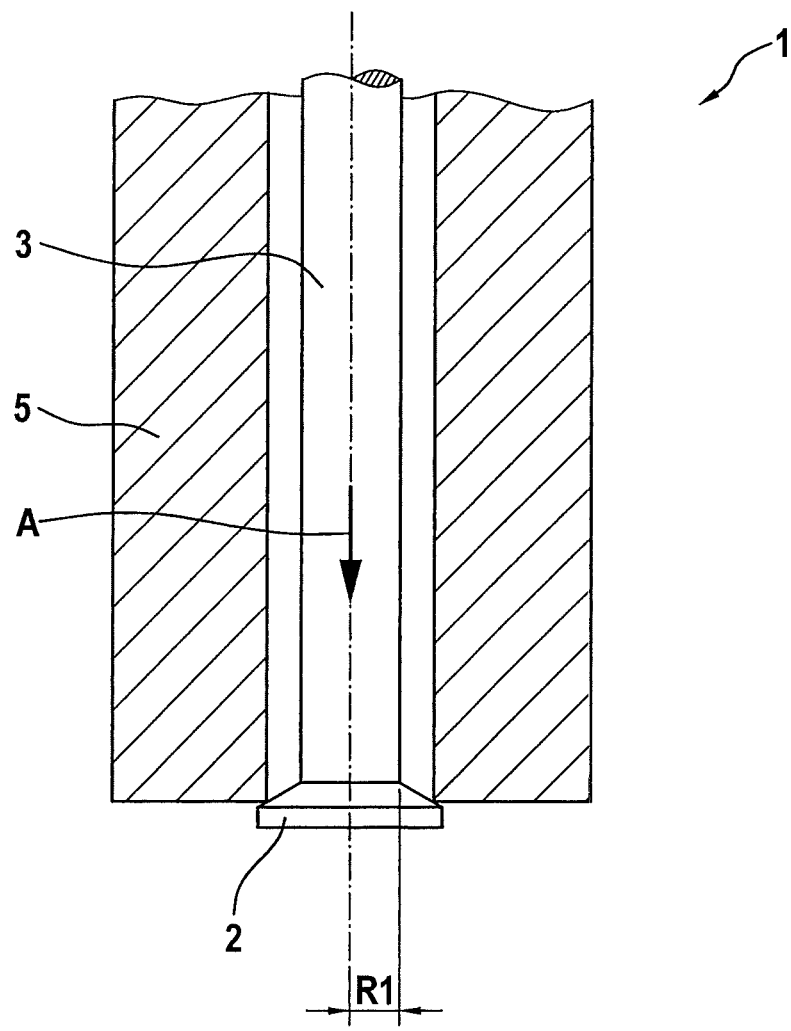
FIG. 1 shows a schematic sectional view of a gas injector according to the related art.
Figure 2:
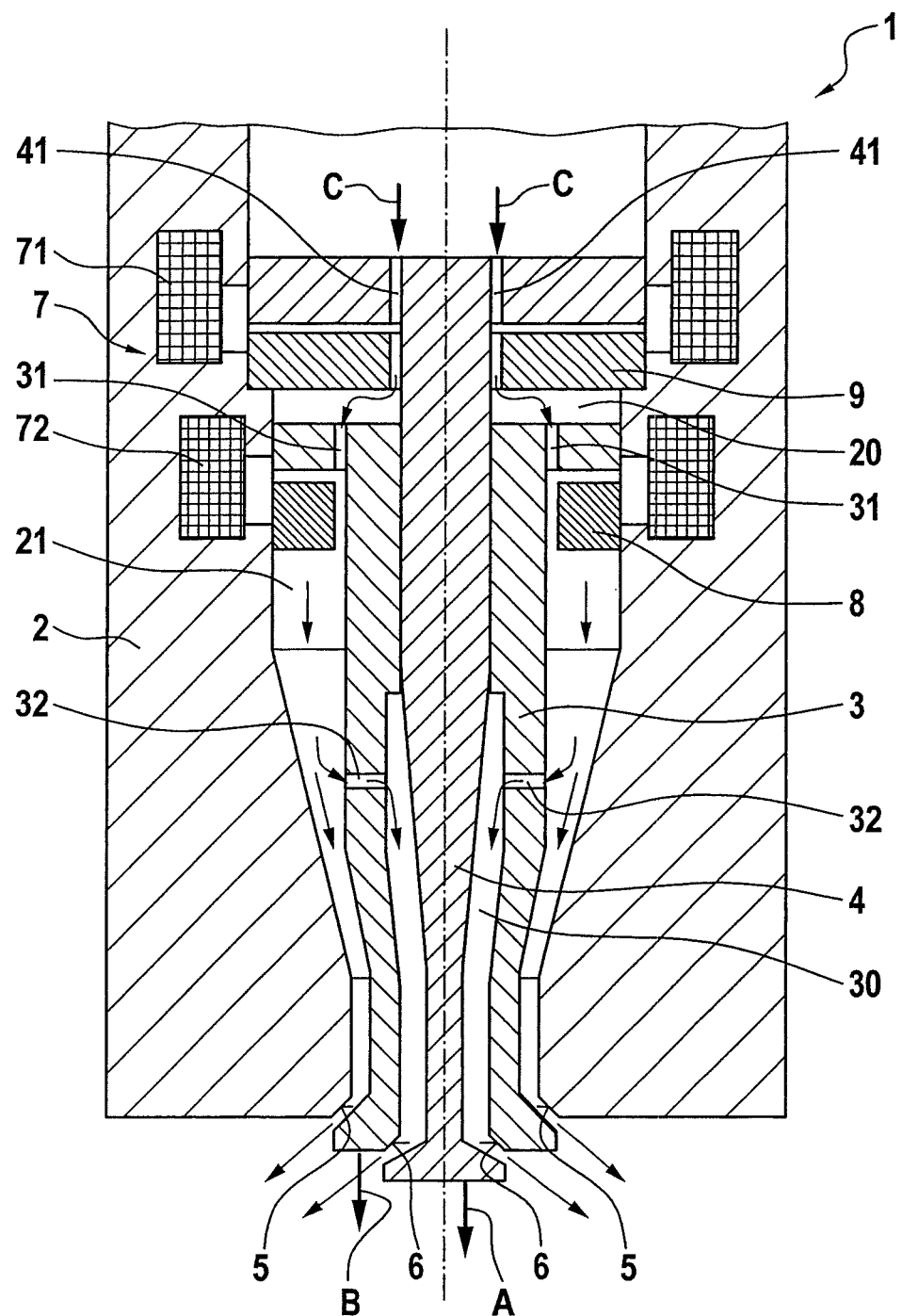
FIG. 2 shows a schematic sectional view of a gas injector according to a first exemplary embodiment of the present invention.

As can be gathered from FIG. 2, gas injector 1 includes a valve body 2 and a needle system which includes an outer needle 3 and an inner needle 4. Inner needle 4 is situated in a hollow region 30 of outer needle 3.

Moreover, gas injector 1 includes an actuator system 7 having a first actuator 71 and a second actuator 72. First actuator 71 actuates inner needle 4, and second actuator 72 actuates outer needle 3. Inner needle 4 is guided inside outer needle 3.

Moreover, a first sealing seat 5 is developed between outer needle 3 and valve body 2. In addition, a second sealing seat 6 is formed between inner needle 4 and outer needle 3. The two sealing seats are developed as circles. Outer needle 3 and inner needle 4 are both provided as outwardly opening needles, so that gas injector 1 is an outwardly opening injector.

In addition, gas injector 1 includes a first stop 8, which restricts a lift travel of outer needle 3, and a second stop 9, which restricts a lift travel of inner needle 4.

The provision of two separate actuators 71, 72 makes it possible to actuate and move outer needle 3 and inner needle 4 separately. As a result, only outer needle 3 may lift off from first sealing seat 5. Alternatively, it is also possible that only inner needle 4 lifts off from second sealing seat 6. As a further alternative, outer needle 3 and inner needle 4 may be lifted off from their sealing seats together. In addition, different opening lifts of outer needle 3 and inner needle 4 are realizable, as well. As a result, the present invention makes it possible to execute quite different injection strategies, which in particular are dependent upon an operating point of an internal combustion engine.

A resetting of outer needle 3 and inner needle 4 takes place via restoring elements (not shown), such as springs.

FIG. 2 shows a partially open state of gas injector 1, in which outer needle 3 has lifted off from first sealing seat 5 and inner needle 4 has lifted off from second sealing seat 6. This is indicated by arrows A and B in FIG. 2. This is not yet the maximum opening position because, as can be gathered from FIG. 2, a space still remains between the plate-shaped end regions of outer needle 3 and inner needle 4 with respect to stops 8, 9 in the region of first and second actuators 71, 72. The two actuators 71, 72 of this exemplary embodiment are magnet armatures. However, it should be noted that piezo actuators may be used as well.

As indicated in FIG. 2 by arrows C, fuel is supplied via multiple openings 41 at the plate-shaped end of inner needle 4, past second stop 9, into a first space 20 in valve body 2. The gas is then able to be supplied from first space 20 into a second space 21 via first through openings 31 in the plate-shaped end region of outer needle 3. Outer needle 3 furthermore is provided with second through openings 32 in a center region, which form a connection between second space 21 and hollow region 30 of outer needle 3. Fuel is therefore able to be guided to sealing seats 5, 6 both at an inner side of outer needle 3 and an outer side of outer needle 3. The flow routes of the gaseous fuel are indicated by the arrows in FIG. 2.

According to the present invention, it is therefore possible to provide a gas injector 1 having a closing element which includes two needles, the closing element opening in the outward direction. Because of dual sealing seat 5, 6, it is also possible to inject greater gas quantities into a combustion chamber during an injection cycle. Gas injector 1 can be disposed directly at the combustion chamber and thus may be a directly-injecting gas injector.

Figure 3:
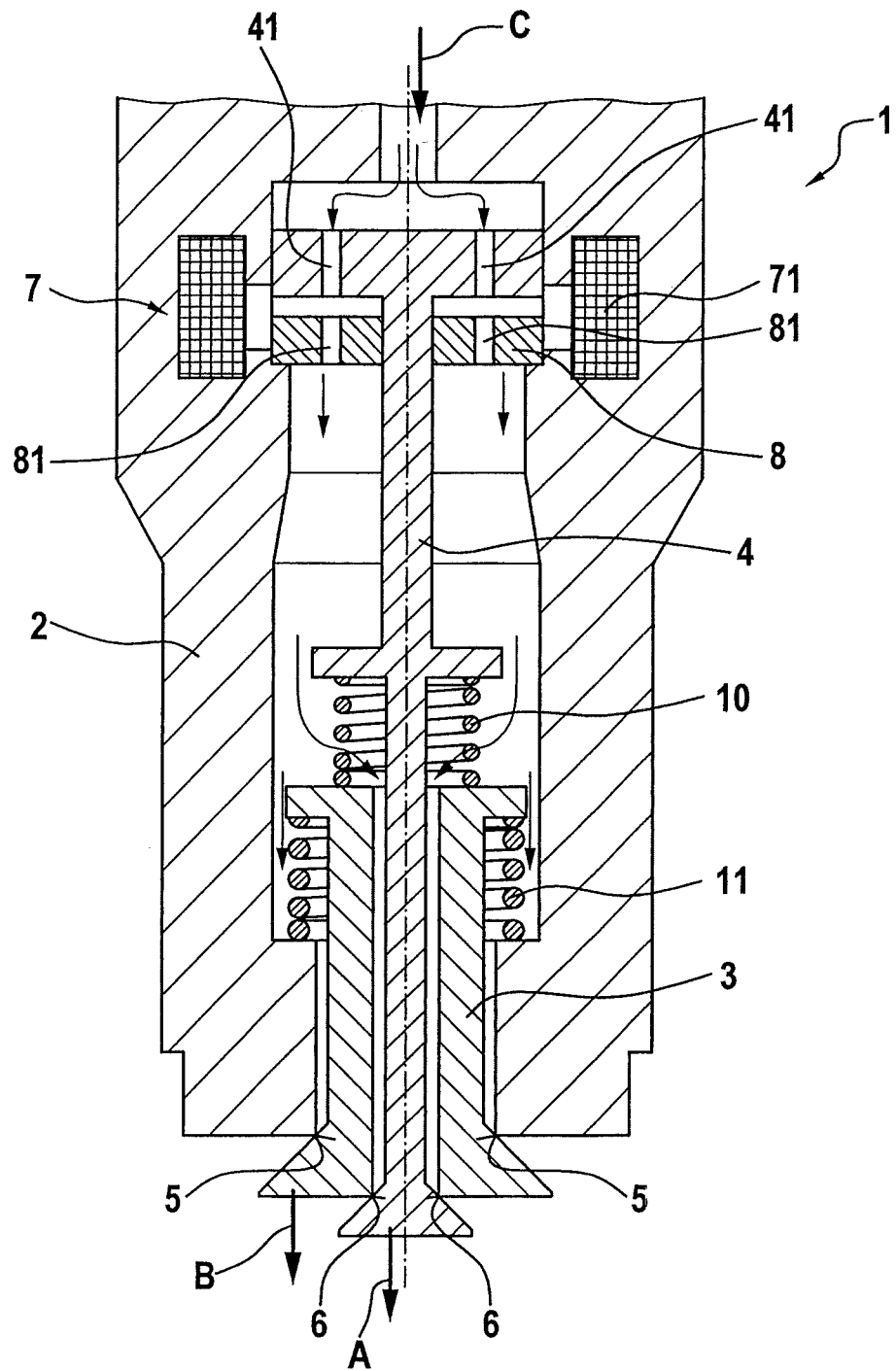
FIG. 3 shows a schematic sectional view of a gas injector according to a second exemplary embodiment of the present invention.

FIG. 3 shows a gas injector 1 according to a second exemplary embodiment of the present invention. In contrast to the first exemplary embodiment, gas injector 1 of the second exemplary embodiment has an actuator system that includes precisely only one actuator 71. In addition, further below, gas injector 1 of the second exemplary embodiment includes a first compression element 10 and a second compression element 11. First compression element 10 is situated between inner needle 4 and outer needle 3. Second compression element 11 is situated between outer needle 3 and valve body 2. Compression elements 10, 11 are cylindrical helical springs and have different spring constants. FIG. 3 shows the closed position of gas injector 1. First sealing seat 5 and second sealing seat 6 are closed. Both compression elements 10, 11 retain gas injector 1 in the closed position. If an injection of gas is to take place, actuator 71 will be actuated, so that inner needle 4 is moved in the direction of arrow A. The maximum lift of inner needle 4 is delimited by stop 8. The axial movement of inner needle 4 compresses first compression element 10. Outer needle 3 still remains closed until the prestress force of first compression element 10, which is compressed more and more, exceeds the force of second compression element 11. At this point, outer needle 3 opens as well. As a result, a gas injector 1 having a stepped opening characteristic can be described in the second exemplary embodiment. Inner needle 4 opens first, followed by outer needle 3. It should be noted that different opening characteristics are able to be realized by selecting different spring constants of compression elements 10, 11. As an alternative, a slaving element may also be provided at inner needle 4, which carries outer needle 3 along and opens it once a specific lift of inner needle 4 has been attained.

What is claimed is:

1. A gas injector for injecting gaseous fuel, comprising:
a valve body;
an outer needle configured as a hollow needle;
an inner needle disposed in a hollow region of the outer needle; and
an actuator system configured to actuate the outer needle and the inner needle independently of each other, wherein the actuator system includes one of a piezo actuator or a magnet actuator;
wherein a first sealing seat is provided between the valve body and the outer needle, and wherein a second sealing seat is provided between the outer needle and the inner needle.

2. The gas injector as recited in claim 1, wherein the actuator system includes a first actuator for actuating the inner needle and a second actuator for actuating the outer needle.

3. The gas injector as recited in claim 1, wherein the actuator system includes only one actuator, a first compression element and a second compression element.

4. The gas injector as recited in claim 3, wherein the first compression element is situated between the inner needle and the outer needle, and wherein the second compression element is situated between the outer needle and the valve body.

5. The gas injector as recited in claim 4, wherein a prestress force of at least one of the first compression element and the second compression element is adjustable.

6. The gas injector as recited in claim 4, further comprising:
a stop, which restricts a lift of at least one of the outer needle and the inner needle.

7. The gas injector as recited in claim 4, further comprising:
a slaving element which, after a predefined lift travel of one of the inner needle or the outer needle, carries along the other one of the inner needle or the outer needle.

8. The gas injector as recited in claim 4, wherein the outer needle and the inner needle are outwardly opening needles.

9. The gas injector as recited in claim 4, wherein the gas injector is part of an internal combustion engine, and wherein the gas injector is disposed directly at a combustion chamber of the internal combustion engine for a direct injection.

10. A gas injector for injecting gaseous fuel, comprising:
a valve body;
an outer needle configured as a hollow needle;
an inner needle disposed in a hollow region of the outer needle; and
an actuator system configured to actuate the outer needle and the inner needle independently of each other,
wherein a first sealing seat is provided between the valve body and the outer needle, and wherein a second sealing seat is provided between the outer needle and the inner needle,
wherein the outer needle and the inner needle are outwardly opening needles.

* * * * *

UNITED STATES PATENT AND TRADEMARK OFFICE
CERTIFICATE OF CORRECTION

PATENT NO. : 9,702,325 B2
APPLICATION NO. : 14/658493
DATED : July 11, 2017
INVENTOR(S) : Felix Jaegle et al.

It is certified that error appears in the above-identified patent and that said Letters Patent is hereby corrected as shown below:

On the Title Page

In Column 1, Item (30) in Foreign Application Priority Data:
Change the priority year "2015" to --2014--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*